United States Patent
Wasilewski

(10) Patent No.: US 7,490,236 B2
(45) Date of Patent: Feb. 10, 2009

(54) CONDITIONAL ACCESS OVERLAY PARTIAL ENCRYPTION USING MPEG TRANSPORT CONTINUITY COUNTER

(75) Inventor: Anthony J. Wasilewski, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1083 days.

(21) Appl. No.: 10/757,636

(22) Filed: Jan. 14, 2004

(65) Prior Publication Data

US 2005/0152548 A1 Jul. 14, 2005

(51) Int. Cl.
*G06F 9/00* (2006.01)

(52) U.S. Cl. .................. 713/160; 713/168; 713/189; 713/191; 713/193

(58) Field of Classification Search .............. 713/160, 713/189, 191, 193, 168
See application file for complete search history.

(56) References Cited

U.S. PATENT DOCUMENTS

| | | | | |
|---|---|---|---|---|
| 5,420,866 | A | 5/1995 | Wasilewski | 370/110 |
| 6,181,706 | B1 | 1/2001 | Anderson et al. | 370/412 |
| 6,424,717 | B1 | 7/2002 | Pinder et al. | 380/239 |
| 2002/0188567 | A1 | 12/2002 | Candelore | 705/51 |
| 2002/0194613 | A1 | 12/2002 | Unger | 725/118 |
| 2002/0196939 | A1 | 12/2002 | Unger et al. | 380/216 |
| 2003/0016949 | A1 | 1/2003 | Unger | 386/94 |

(Continued)

FOREIGN PATENT DOCUMENTS

| CA | 2405899 | 4/2003 |
|---|---|---|
| EP | 1397007 | 8/2003 |

OTHER PUBLICATIONS

Scientific-Atlanta, Inc. Pending U.S. Appl. No. 10/602,987, filed Jun. 25, 2003, Title: "Method for Partially Encrypting Program Data," Inventors: Anthony J. Wasilewski and Howard G. Pinder.

(Continued)

*Primary Examiner*—Thomas R Peeso

(57) ABSTRACT

A conditional access overlay system utilizing partial encryption without requiring additional program identifiers. The conditional access overlay system generates duplicate critical packets for separate encryption that are sent using the same packet identifier. The rest of the content stream is sent in the clear. However, these duplicated packets are sent without incrementing a continuity counter relative to one another. The overlay packets with non-incremented continuity counter are sent as the second packet immediately following the original critical packet. At the receivers, the incumbent set-top will use the first of the two encrypted packets while the overlay set-top is programmed to use the second of the two encrypted packets. Therefore, methods for verifying alignment of associated packets may be used to distinguish between multiple encryption methods in conditional access overlay systems.

30 Claims, 6 Drawing Sheets

U.S. PATENT DOCUMENTS

| | | | |
|---|---|---|---|
| 2003/0021412 A1 | 1/2003 | Candelore et al. | 380/217 |
| 2003/0026423 A1 | 2/2003 | Unger et al. | 380/217 |
| 2003/0046686 A1 | 3/2003 | Candelore et al. | 725/31 |
| 2003/0081776 A1 | 5/2003 | Candelore | 380/200 |
| 2004/0139337 A1 | 7/2004 | Pinder et al. | 713/189 |

OTHER PUBLICATIONS

Scientific-Atlanta, Inc. Pending U.S. Appl. No. 10/629,839, filed Jul. 30, 2003, Title: "Methods and Apparatus for Providing a Partial Dual-Encrypted Stream in a Conditional Access Overlay System," Inventors: Howard G. Pinder, William D. Woodward, Jr., Jonathan Evans, and Anthony J. Wasilewski.

Scientific-Atlanta, Inc. Pending U.S. Appl. No. 10/602,986, filed Jun. 25, 2003, Title: "Method for Partially Encrypting Program Data," Inventors: Anthony J. Wasilewski and Howard G. Pinder.

Scientific-Atlanta, Inc. Pending U.S. Appl. No. 10/602,988, filed Jun. 25, 2003, Title: "Method for Partially Encrypting Program Data," Inventors: Anthony J. Wasilewski and Howard G. Pinder.

Scientific-Atlanta, Inc. Pending U.S. Appl. No. 10/719,161, filed Nov. 21, 2003, Title: "A Partial Dual-Encrypted Stream Utilizing Program Map Tables," Inventors: Howard G. Pinder, Jonathan Evans, Anthony J. Wasilewski and William D. Woodward, Jr.

Standardiztion of Conditonal Access Systems for Digital Pay Television By—D Van Schoonevled, pp. 217-225, 1996.

Information Technology-Generic Coding of Moving Pictures and Associated Autio Information By—Technologies of Information, pp. I-XY, XP00067435—p. 18, Apr. 15, 1996.

CONDITIONAL ACCESS OVERLAY PARTIAL ENCRYPTION USING MPEG TRANSPORT CONTINUITY COUNTER

TECHNICAL FIELD

The present invention relates to conditional access systems used to control availability of programming in content delivery systems and, more particularly, relates to providing partial dual encryption to permit different proprietary set-tops to be utilized in a single cable television system.

BACKGROUND OF THE INVENTION

The control of content is important in order to protect programming from, for example, nonpaying customers. A conventional communications system, such as a cable television system, therefore, typically applies an encryption scheme to digital television content in order to prevent unrestricted access. Once a system operator chooses an encryption scheme, the operator installs all of the necessary headend equipment (e.g., Scientific-Atlanta's conditional access software and associated equipment). The receiving devices (e.g., set-tops) located at the subscriber's premises must be compatible with the encryption scheme in order to decrypt the content for viewing. Due to the (at least partial) proprietary nature of conditional access systems, however, an operator is prevented from installing different set-tops that do not have the proper decryption keys and decryption algorithms. If the operator wishes to install different set-tops that decrypt a different conditional access system, the operator would also have to install a second proprietary encryption system to overlay the incumbent encryption system in order to use both set-tops.

It would be to the operator's advantage to be able to select set-tops from any manufacturer and easily implement different encryption/decryption schemes in the system without totally duplicating the headend equipment and utilizing substantially extra bandwidth. For example, a portion, but not all, of the data required for full presentation of a television program is encrypted according to one encryption scheme and then the same portion of data is encrypted again according to a second encryption scheme. The first encryption scheme corresponds to the legacy or incumbent set-top and the second encryption scheme corresponds to the non-legacy or overlay set-top. The remaining data is transmitted unduplicated in the clear to minimize the bandwidth impact.

Unique integer values commonly referred to as packet IDs (PIDs) are used to associate packets carrying elementary streams of a program in a single or multiple program transport stream. Known implementations of partial dual encryption involve duplicating only certain packets in a transport stream tagged with a certain PID. An additional or secondary PID is then mapped to each duplicated component to distinguish between duplicated content. Various known methods such as time slicing, $M^{TH}$ & N packet encryption, data structure encryption, or system information (SI) encryption are used to select the portions of the information as critical packets to be encrypted. Critical packets are packets selected for encryption based upon their importance to the proper decoding of the program content. For example, in MPEG content streams, critical packets are preferably packets containing higher-level headers such as picture headers, GOP headers, etc. Also, various encryption methods such as those found in Power-KEY®, from Scientific-Atlanta, Inc., may be utilized to encrypt the portions once selected while leaving other portions in the clear.

However, original PIDs, commonly referred to as legacy or primary PIDs, continue to tag the packets encrypted with the legacy encryption as well as the other packets sent in the clear. By using primary and secondary PIDs, the decoder located in a set-top box can determine which packets are to be decrypted using the encryption method associated with that particular set-top box. In other words, regardless of the manner in which packets are selected for encryption and the encryption used, PID mapping or manipulation techniques are used to distinguish between multiple encryptions. For example, the legacy set-top decrypts the packets tagged with the primary PIDs and the overlay set-top decrypts the packets tagged with the secondary PIDs. The legacy set-top ignores the encrypted packets with the secondary PIDs and the overlay set-top ignores the encrypted packets with the primary PIDs. Set-tops, whether legacy or overlay, can determine which portions of the transport stream are transmitted and received in the clear. Once identified, the packets transmitted in the clear pass through the descramblers unaffected.

Therefore, known overlay systems manipulate PIDs to distinguish between multiple encryptions. However, duplicating and remapping of PIDs as explained above requires special PSI (Program Specific Information) such as reconfiguration of the PMT (Program Map Table). What is needed is a method and system that can distinguish between multiple partial encryptions without duplicating and remapping of PIDs.

BRIEF DISCRIPTION OF THE DRAWINGS

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

A clear multiprogram transport stream (MPTS) is provided to a headend facility. The clear MPTS includes several streams of unencrypted programs each including video, audio, and data packets. The packets each have a packet identifier (PID) to associate packets of elementary streams of the MPTS. Typically, an encryption scheme encrypts some or all of the packets (herein referred to as critical packets) of some or all of the programs depending upon the level of desired security.

However, if the operator wishes to install different set-tops that decrypt a different conditional access system, the operator would also have to install a second proprietary encryption system to overlay the incumbent encryption system in order to use both set-tops. As explained above, PID mapping techniques are known to distinguish between multiple encryptions.

Figure 1:
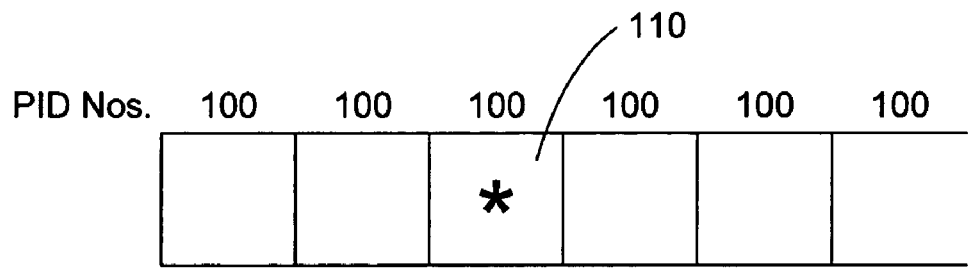
FIG. 1 illustrates a program including a critical packet.
Figure 2:
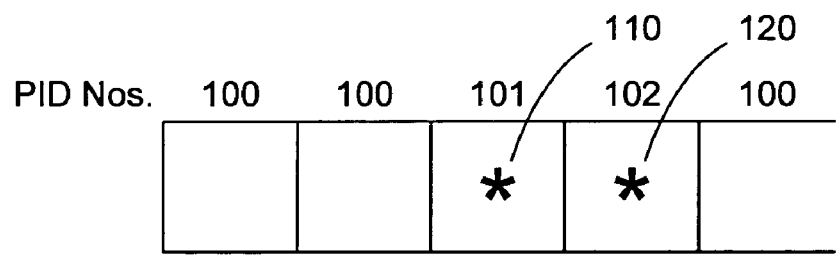
FIG. 2 illustrates the program and critical packet of FIG. 1 where the critical packet has been duplicated and remapped according to the prior art.

As taught in the prior art, a clear stream is provided to a critical packet identifier, duplicator, and remapper device (IDR). The identifier device identifies a critical packet in a program. FIG. 1 is an illustration of a stream of associated packets each having a PID 100. One of the associated packets in the stream is identified as a critical packet 110. The predetermined critical packet 110 is identified from the stream and duplicated. FIG. 2 is an illustration of the critical packet 110 and the resulting duplicated packet 120. The IDR remaps the two critical packets 110, 120 to have differing PID values. For example, as shown in FIG. 2, if the PID has an original value of 100, the IDR may remap the critical packet 110 to have a PID value of 101 and remap the duplicated packet 120 to have a PID value of 102. Now the duplicate packets 110, 120 have PID values that are distinguishable from one another as well as distinguishable from the PID values of the other packets in the stream.

One scrambler is then programmed to detect the PID values of the critical packets having the remapped PID 101 and scramble them with a first encryption scheme A. A second scrambler then detects the duplicated packets having the remapped PID value 102 and scrambles them according to a second encryption scheme B. The transport stream including the two encryption streams A and B and the clear stream C are subsequently provided to a PID remapper. The PID remapper then remaps the clear stream C to have the same PID value as the first encryption stream (e.g., PID 100 to PID 101). The transported stream may then include, for example, a percentage, such as 98%, of the clear stream C and a percentage, such as 2%, of both of the encrypted streams A and B. In this manner, an incumbent set-top, which is designed to decrypt encryption scheme A, receives 98% of the clear stream and 2% of the encrypted stream A. The remaining 2% of the encrypted stream B is simply not processed and discarded.

There are, however, several disadvantages with the prior art teachings. More specifically, known dual partial encryption systems rely on controlling the incumbent headend encryption equipment to the level of specifying exactly which PIDs to encrypt, which would be extremely difficult to accomplish in some existing encryption systems. For example, a Scientific-Atlanta encryption system, as described in U.S. Pat. No. 6,424,717, does not provide a control interface to encrypt a specific PID. The encryption schemes are performed at the program level and would require extensive recreations of a program mapping table and its associated sessions.

In contrast, the present invention does not require any changes to the incumbent headend equipment or require any special control. More specifically, the present invention simply utilizes the output of the existing headend equipment without modifications. Another disadvantage, is that the prior art requires two operations on the clear stream by the over-layed headend equipment; specifically, a first time for the critical packet selection and again for the PID remapping. The present invention, however, only processes the streams once using one piece of equipment. Advantageously, this is an improvement that reduces the cost and the complexity of the conditional access overlay system.

The present invention allows for two different decryption devices (e.g., a legacy, incumbent, or first, set-top and a non-legacy, non-incumbent, overlay, or second, set-top) to be located in a single system having an incumbent encryption scheme A and a second encryption scheme B. Each set-top is designed to decrypt the first or second proprietary encryption schemes, respectively. In accordance with the present invention, however, the conditional access overly system allows partial dual encryption without requiring an additional PID be used for the overlay packets and, therefore, foregoing PID mapping or manipulation techniques to distinguish between multiple encryption schemes.

Figure 3:
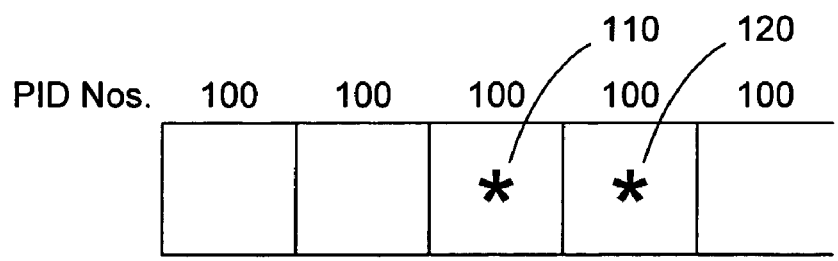
FIG. 3 illustrates the program and critical packet of FIG. 1 where the critical packet has been duplicated according to one embodiment of the present invention.

In FIG. 3, which is similar to FIG. 1, each packet in the stream of associated packets has a PID 100 and one of the associated packets in the stream is identified as a critical packet 110. The predetermined critical packet 110 is identified from the stream and duplicated. However, in FIG. 3, the critical packets 110, 120 are not remapped to have differing PID values as depicted in FIG. 2. As shown in FIG. 3, if the PIDs of the associated packets in the stream have an original value of 100, both the critical packet 110 and the duplicated packet 120 retain a PID value of 100. In the present invention, the duplicate packets 110, 120 have PID values that are indistinguishable from one another as well as indistinguishable from the PID values of the other packets in the stream.

Figure 4:
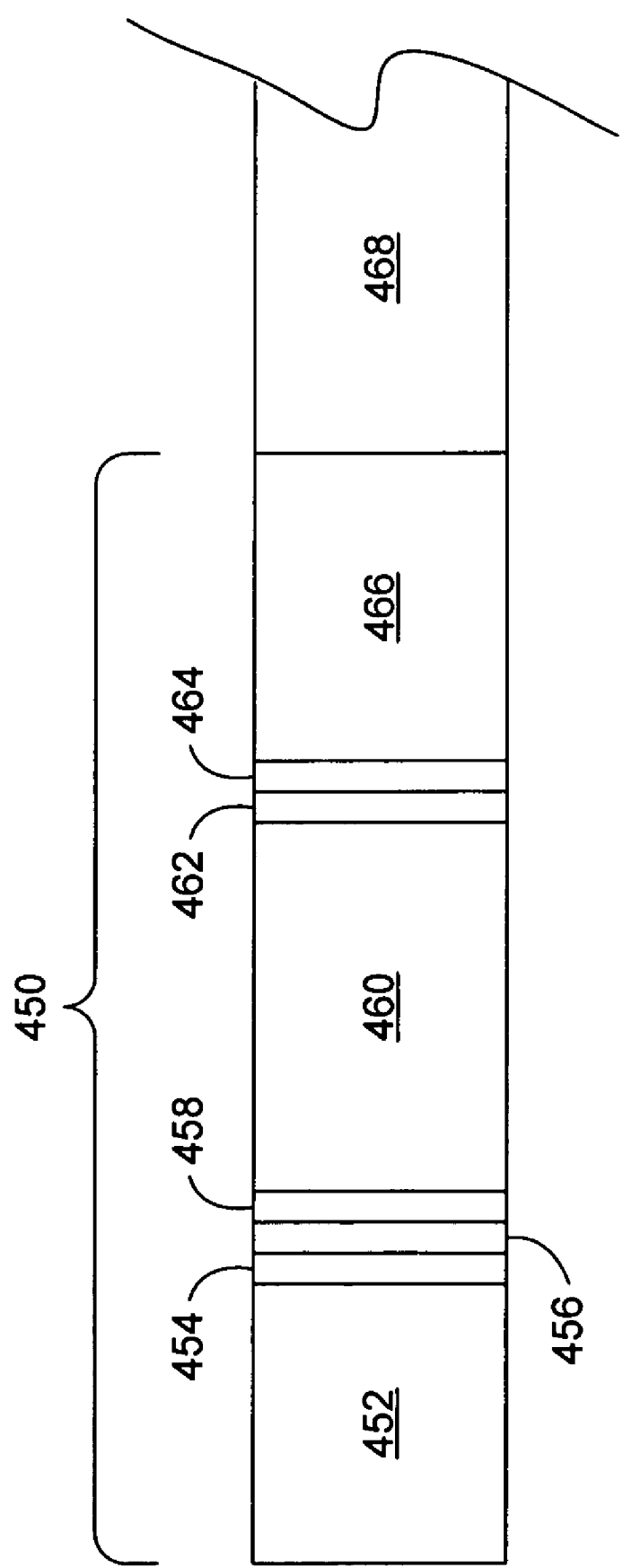
FIG. 4 illustrates the packet structure of an MPEG-2 transport stream header.

FIG. 4 illustrates an MPEG-2 transport stream header 450 of a packet. All packets also include a payload. The header 450 is a fixed length of four bytes for containing instructions about the data in the packet. These instructions are contained in fields of information which includes the sync byte 452 that identifies the start of the packet, the transport error indicator 454, the payload unit start indicator 456, the transport priority 458, the packet identifier (PID) 460 which provides the stream association of the packet, the transport scrambling control 462, the adaptation field control 464, the continuity counter (CC) 466 which is used for duplicating packets for purposes of error resiliency, and the payload 468. The rules concerning these fields of information, in particular the continuity counter 466, along with other syntax details, can be found in the MPEG-2 (ISO/IEC 13818-1) systems standard.

According to the present invention, an overlay conditional access system may be implemented, without requiring that an additional PID be used for the overlay packets to be processed by the overlay system, by utilizing the continuity counter 466 to support conditional access overlay. Typically, in a continuous stream of transport packets, the continuity counter 466 is incremented with each transport stream packet having the same PID. However, instead of sending duplicate packets for the overlay set-top of the conditional access overlay system in a different PID as explained above in the prior art, the duplicate critical packets are sent using the same PID with the continuity counter 466 in the header 450 not incremented. Those skilled in the art of the present invention will appreciate that a multiplexer may be recoded to generate a duplicate packet from a critical packet to define a pair of duplicate packets and will further appreciate that the multiplexer may be coded to not increment the second of the two duplicate packets. Therefore, an MPEG method for verifying duplication of associated packets may also be used to distinguish between multiple encryption schemes in a conditional access overlay system based upon the alignment of the packets.

According to the MPEG-2 standard, the continuity counter 466 is a four bit field that wraps around after its maximum of sixteen binary values has been obtained. Also, a particular transport stream packet is continuous when its continuity counter is incremented by one relative to the previous packet of the same stream. In duplicate packets, each byte of the original packet is duplicated, with the exception of the program clock reference fields, if present. Therefore, in transport streams according to the MPEG-2 standard, duplicate packets are only sent as two consecutive transport stream packets of the same PID and have the same continuity counter value as the original packet.

Figure 5:
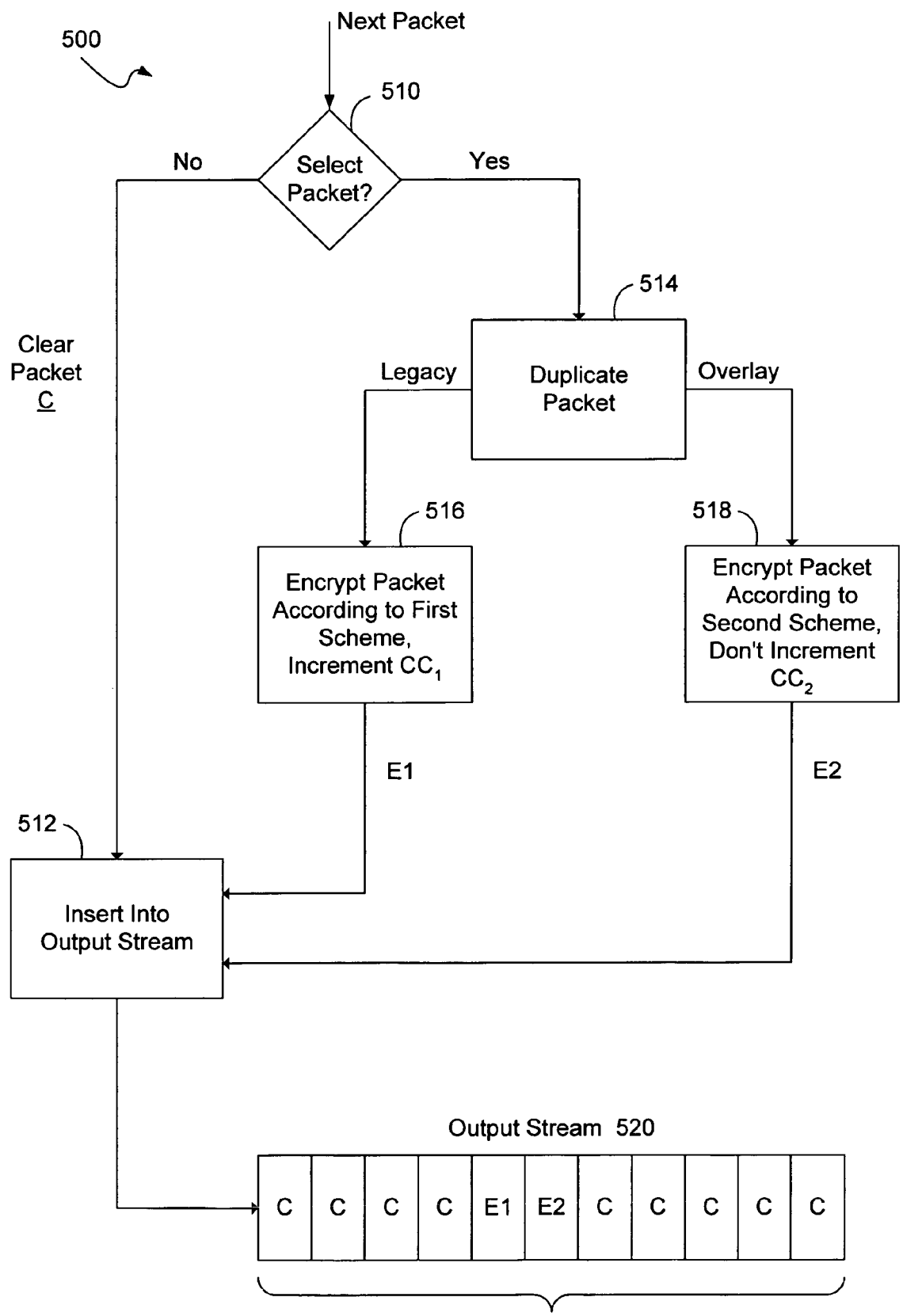
FIG. 5 is a flow chart of a dual encryption system according to one embodiment of the present invention.

FIG. 5 illustrates a process 500 for encoding at the cable system headend that can be used to implement the present invention with a dual encryption system utilizing the continuity counter 460 to distinguish between multiple encryption schemes in a single program. In process 500, as a transport packet is received in decision block 510, a decision is made as to whether the packet is a critical packet to be encrypted for either the legacy or overlay set-tops. If the decision is NO, the packet is a clear packet C not to be encrypted and is passed to process block 512 for insertion into the output stream. If the decision at decision block 510 is YES, the incoming packet is a critical packet to be encrypted and received by both the legacy and the overlay set-top. From decision block 510, the critical packet is passed to process block 514 where the critical packet is duplicated to define a pair of duplicate packets and it is determined whether either of the duplicate packets is for the legacy or overlay set-top.

The first of the duplicate packets is to be encrypted according to a first encryption scheme corresponding to the legacy headend equipment and set-top and the second of the duplicate packets, which follows the first of the duplicate packets, is to be encrypted according to a second encryption scheme corresponding to the overlay set-top. The overlay packets are to be sent as the second of the duplicate packets and should immediately follow the first of the duplicated packets. Therefore, according to the present invention, the packet to be encrypted according to the first encryption scheme is to have an incremented continuity counter $CC_1$ and is passed along the LEGACY branch from process block 514. The overlay packet to be encrypted according to the second encryption scheme is to have a non-incremented continuity counter $CC_2$ and is passed along the OVERLAY branch from the process block 514.

The duplicate packet on the LEGACY branch from process block 514, with the continuity counter incremented, is encrypted at process block 516 according to the first encryption scheme and the corresponding duplicate packet on the OVERLAY branch from process block 514, with the continuity counter having not been incremented relative to the first duplicate packet (i.e. for the duplicate packets, $CC_1=CC_2$), is encrypted at process block 518 according to the second encryption scheme. The encrypted packet E1 from process block 516 and the encrypted packet E2 from process block 518 are passed to process block 512 to be inserted into the output stream 520 along with the clear packets C. As shown in FIG. 5, the encrypted packet E1, the encrypted packet E2, and the clear packets C of the output stream 520 have an identical PID. Also, packet E2 immediately follows packet E1.

Figure 6:
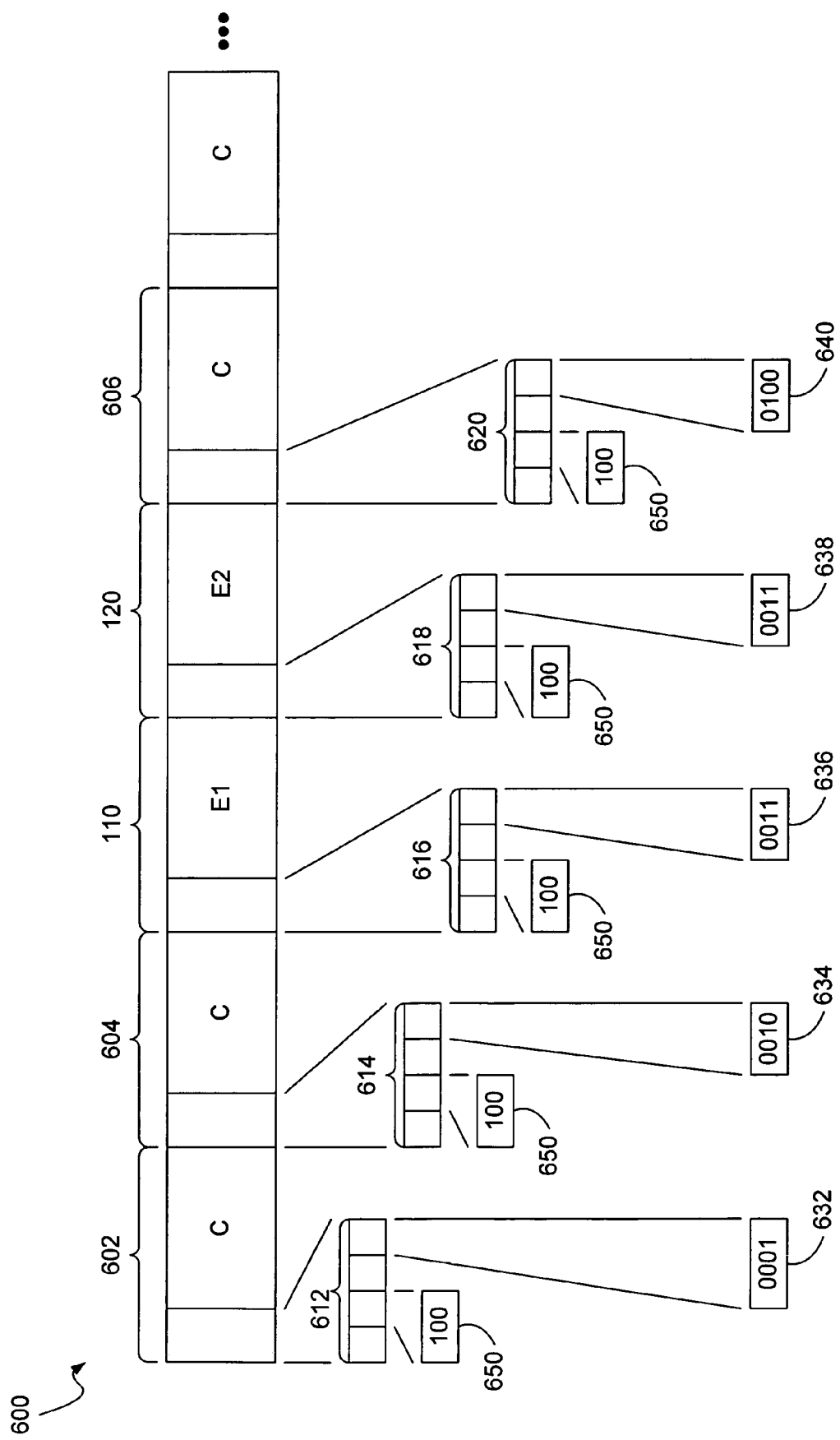
FIG. 6 illustrates one embodiment of the application of the present invention in a packet transport stream.

FIG. 6 illustrates one embodiment of a packet transport stream 600 according to one embodiment of the present invention. The packet transport stream 600 includes a substantially continuous plurality of transport packets including, for example, duplicate transport packets 110 and 120 from FIG. 3 which are encrypted according to the first and second encryption schemes, respectively. The packet transport stream 600 further includes clear transport packets 602 and 604 that immediately precede duplicate transport packets 110 and 120. The packet transport stream 600 further includes clear transport packet 606 that immediately follows duplicate transport packets 110 and 120.

Still referring to FIG. 6, as best seen from left to right, transport packet 602 includes a header 612, transport packet 604 includes a header 614, transport packet 110 includes a header 616, transport packet 120 includes a header 618, and transport packet 606 includes a header 620. Also, header 612 includes a continuity counter 632, header 614 includes a continuity counter 634, header 616 includes a continuity counter 636, header 618 includes a continuity counter 638, and header 620 includes a continuity counter 640. Within each of the headers 612, 614, 616, 618 and 620 is the PID 650 having an identical value.

The continuity counters 632, 634 and 636 have been incremented by one and, therefore, have consecutive binary values "0001", "0010", and "0011", respectively. However, the continuity counter 638 has a value of "0011" which is identical to the value "0011" of continuity counter 636 because the transport packet 120 is a duplicate of original critical packet 110.

Also, the continuity counter 638 within the header 618 of the transport packet 120 was not incremented according to the present invention in order to distinguish between the multiple encryption schemes. The continuity counter 640 within the header 620 of clear transport packet 606 has a value of "0100" and is, therefore, incremented as if it directly followed duplicate transport packet 120.

Figure 7:
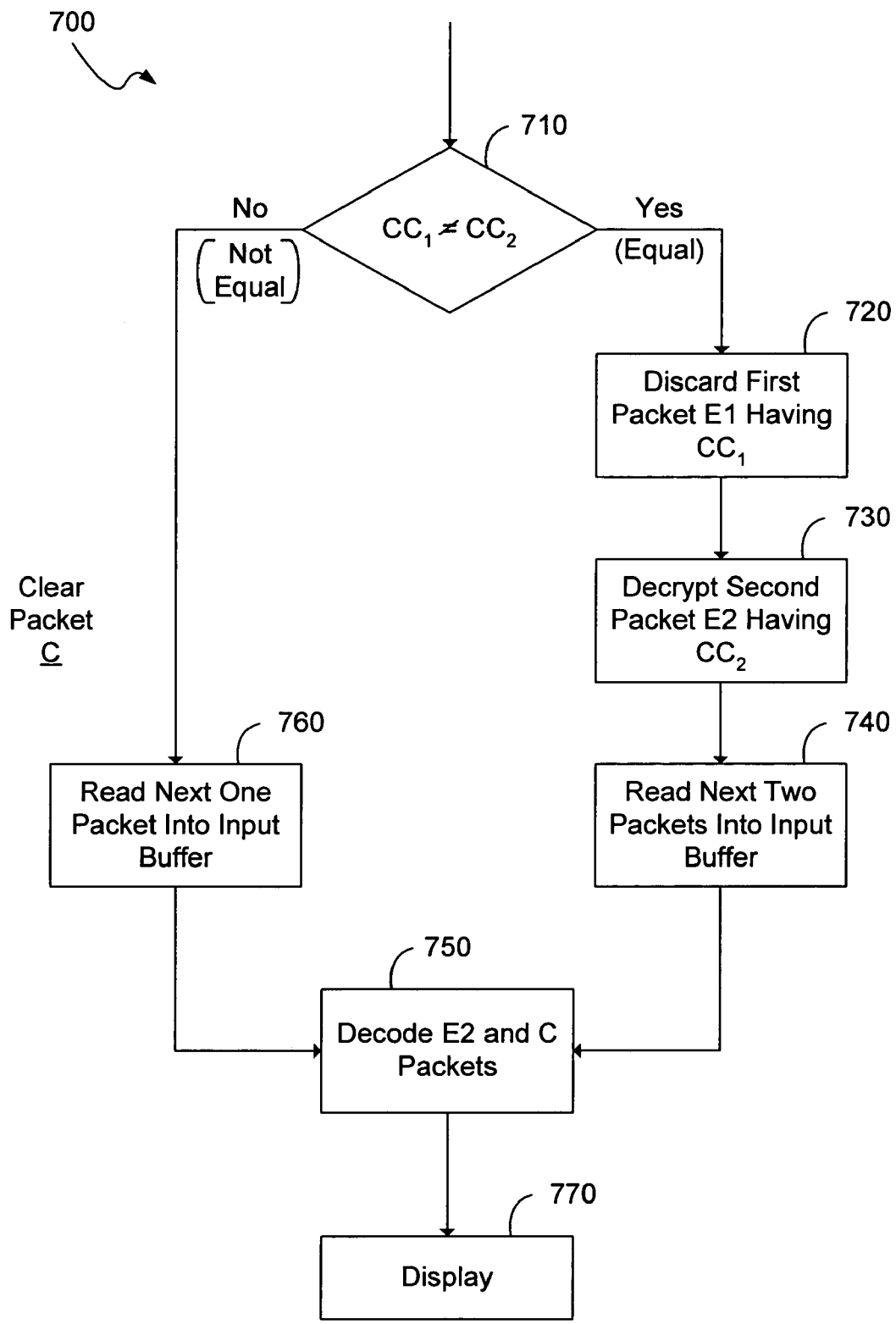
FIG. 7 is a flow chart illustrating one embodiment of an overlay decoding system according to the present invention.

FIG. 7 illustrates a process 700 for an overlay decoding system according to one embodiment of the present invention. As explained above, the overlay set-top corresponds to the second encryption scheme and, therefore, can decrypt and decode the duplicate packet encrypted by the second encryption scheme. The overlay set-top is similar to the legacy set-top except that the overlay set-top is required to provide a "look ahead" state in order to recognize, compare and maintain different continuity counters as explained below. Those skilled in the art of the present invention will appreciate how to code a set-top for recognizing, comparing, and maintaining continuity counter values.

In decision block 710, packets are received into a buffer where it is decided whether either of a pair of packets will be decoded by reading the continuity counter within the headers of the packets. The continuity counters of a pair of packets in the buffer are compared to one another and, therefore, the overlay decoder looks ahead to the continuity counter of the second of a pair packets in order to determine whether either of the pair of packets should be processed. If the value of the continuity counter $CC_1$ of the first duplicate packet E1 encrypted according to the first encryption scheme is equal to the continuity counter $CC_2$ of the second duplicated packet E2 encrypted according to the second encryption scheme, because the continuity counter $CC_2$ was not incremented, the packet E2 is processed by the overlay set-top. In such case, as shown in process block 720, the first packet E1 in the buffer will be discarded and, as shown in process block 730, the second packet E2 is forwarded to be decrypted. Packet E1 is discarded because the overlay set-top cannot decrypt packet E1. Because the process 700 has identified a pair of duplicate packets E1 and E2 having the same continuity counter, two new incoming packets will then have to be loaded into the buffer as shown in process block 740. The decrypted packet E2 from process block 730 is forwarded to process block 750 for decoding.

On the other hand, when comparing a pair of packets at the decision block 710, if the value of the continuity counter $CC_1$ is not equal to the continuity counter $CC_2$, the process 700 continues to process block 760 where the next one of the incoming packets is read into the input buffer. Because the packets in the buffer in this case are incremented relative to one another, the packets are clear packets C that are forwarded directly to process block 750 to be decoded. However, in order to then perform additional comparisons, the value of continuity counter $CC_1$ is replaced with the value of the previous compared continuity counter $CC_2$. The value of the continuity counter of the next incoming packet may be stored as $CC_2$ to then be compared with the updated value stored in $CC_1$ from the next one incoming packet to the buffer. From process block 750, the decrypted and decoded content can be displayed as shown in process block 770.

Figure 8:
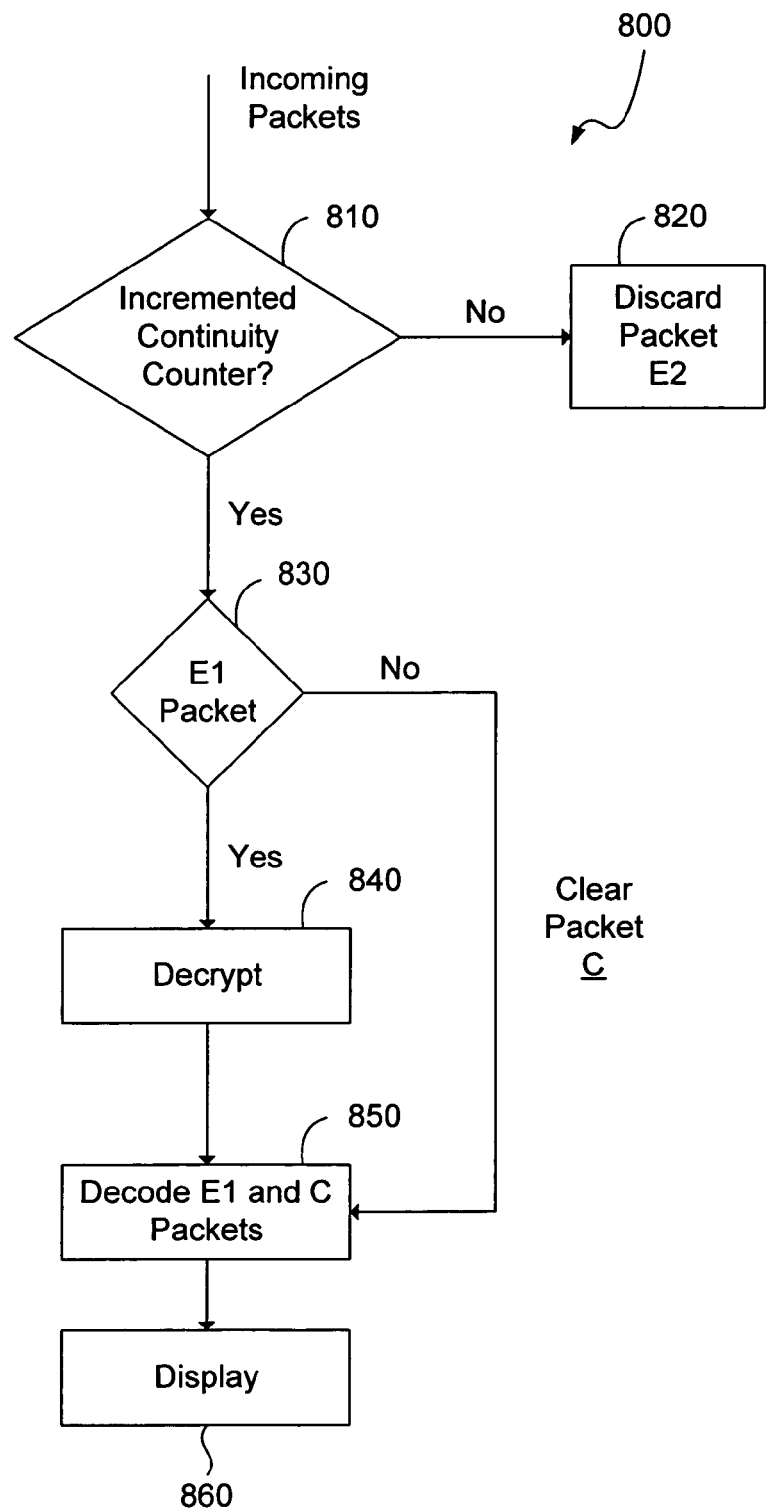
FIG. 8 is a flow chart illustrating one embodiment of a legacy decoding system according to the present invention.

FIG. 8 illustrates a process 800 for a legacy decoding system according to one embodiment of the present invention. A typical MPEG compliant decoder would perform the steps of the process 800 without modification. As explained above, the legacy set-top corresponds to the first encryption scheme and, therefore, can decrypt and decode the duplicate packet encrypted by the first encryption scheme. In decision block 810, the continuity counters of a pair of incoming packets in a buffer are inspected to determine whether the continuity counters are consecutively incremented relative to one another. If the continuity counters are not consecutively incremented, the second of the two incoming packets is the duplicate packet E2 encrypted under the second encryption scheme for the overlay set-top box.

In such case, the process 800 continues to process block 820 where the packet E2 is discarded. The packet E1 will be processed and the packet E2 will be discarded because MPEG compliant set-tops are required to always inspect the continuity counter and, if it has already successfully received the first of the duplicated packets E1 with the same continuity counter, packet E1 will be processed and the second of the duplicate packets E2 with the same continuity counter will be skipped. Therefore, implementation of the present invention should not disrupt the functioning of previously deployed legacy set-tops.

On the other hand, in decision block 810, if the continuity counters of the pair of packets are properly incremented relative to one another, then the process 800 continues to decision block 830 where the process 800 distinguishes between the encrypted packets E1 and the incoming clear packets C. In decision block 830, if packet E1 is present, then the packet E1 is forwarded to process blocks 840 and 850 for decryption and decoding, respectively. If the packet at decision block 830 is not packet E1 encrypted according to the first encryption method, then the packet is a clear packet C that is forwarded directly to process block 850 to be decoded. The decrypted and decoded content can then be displayed as shown in process block 860.

It should be noted that the MPEG prohibition on using non-incremented continuity counter values in transport packets that have the adaptation field control bits set to "00" (ISO reserved) or "10" (adaptation field only, no payload) does not present a problem for the present invention. The case of the adaptation field set to "00", is not permitted by MPEG and set-tops would ignore such packets. In the case of the adaptation field set to "10", the second of the duplicate packets does not need to be duplicated and must be left in the clear since it is forbidden by the MPEG standard to encrypt the content of adaptation fields.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A partially encrypted signal comprising:
    a plurality of encrypted packets, a portion of said encrypted packets encrypted according to a first encryption scheme to define first encrypted packets and another portion of said encrypted packets encrypted according to a second encryption scheme to define second encrypted packets; and
    a plurality of unencrypted packets, wherein at least a portion of said unencrypted packets, at least one of said first encrypted packets, and at least one of said second encrypted packets are indistinguishable from one another based upon a packet identifier, and
    wherein said at least one each of said first and second encrypted packets being indistinguishable from one another based upon said packet identifier are also indistinguishable based upon a continuity count.

2. The partially encrypted signal of claim 1 received in a set-top, said set-top adapted to select either of said first and second encrypted packets, being indistinguishable from one another based upon said packet identifier and said continuity count, based upon the order said first and second encrypted packets are received relative to one another in said set-top.

3. The partially encrypted signal of claim 2 wherein said selected one of said first and second encrypted packets is decrypted to produce decrypted content and the other said packet of said first and second encrypted packets is discarded.

4. The partially encrypted signal of claim 1 wherein said first and second encrypted packets have duplicate content and are adjacent to one another in said signal, and wherein a continuity counter of said second encrypted packet has not been incremented.

5. The partially encrypted signal of claim 1 wherein packet identifiers of said first and second encrypted packets have not been remapped.

6. A method of partially encrypting content comprising the steps of: packetizing said content into a plurality of packets and at least a portion of said plurality of packets having an identical packet identifier;
    reproducing a critical packet to produce duplicate packets having said identical packet identifier;
    encrypting one of said duplicated packets according to a first encryption scheme to produce a first encrypted packet and encrypting the other of said duplicated packets according to a second encryption scheme to produce a second encrypted packet; and
    distinguishing between said first and second encrypted packets having said identical packet identifier based upon the alignment of said first and second encrypted packets relative to one another.

7. The method of claim 6 further comprising the steps of consecutively incrementing a continuity counter of each said plurality of packets having said identical packet identifier when packetizing said content, and maintaining said identical packet identifier and identical values for each said continuity counter of said duplicated packets.

8. A method of processing packets, comprising the steps of:
    receiving first a first encrypted packet having a first packet identifier and a first continuity counter;
    receiving second a second encrypted packet having said first packet identifier and said first continuity counter, wherein said first and second encrypted packets were encrypted according to first and second encryption schemes, respectively;
    distinguishing between said first and second encrypted packets based upon the order said first and second encrypted packets are received; and
    performing one of the following steps:
        discarding said first encrypted packet because said second encrypted packet was received subsequent to receiving said first encrypted packet; or
        discarding said second encrypted packet because said first encrypted packet was received before receiving said second encrypted packet.

9. The method of claim 8 further comprising the steps of decrypting and decoding one of the first and second encrypted packets which has not been discarded.

10. A method of decoding partially encrypted content comprising the steps of:
    receiving partially encrypted content comprising unencrypted content, first encrypted content encrypted under a first encryption scheme and second encrypted content encrypted under a second encryption scheme;

selecting one of said first and second encrypted content to decrypt based upon the alignment of said first and second encrypted content relative to one another;
decrypting said selected one of said first and second encrypted content to produce decrypted content; and
decoding said unencrypted content and said decrypted content to decode said partially encrypted content.

11. The method of claim 10 wherein said first and second encrypted content is packetized into packets and at least a portion of said packets of said first and second encrypted content is received having the same packet identifier.

12. The method of claim 10 wherein said first and second encrypted content is packetized into packets and at least a portion of said packets are received having the same value for a counter incremented to verify continuity of said packets.

13. A television set-top box comprising:
a receiver that receives:
a plurality of unencrypted packets;
a plurality of first encrypted packets encrypted according to a first encryption scheme; and
a plurality of second encrypted packets encrypted according to a second encryption scheme; and
a decrypter that discards one of said first and second encrypted packets based upon the alignment of said first and second encrypted packets relative to one another and decrypts the other of said first and second encrypted packets.

14. The television set-top box of claim 13 wherein one of said second encrypted packets is received subsequent to one of said first encrypted packets, said one second encrypted packet is decrypted, and said one first encrypted packet is discarded.

15. The television set-top box of claim 13 wherein at least one of said first encrypted packets and at least one second encrypted packets are indistinguishable from one another based upon a packet identifier.

16. The television set-top box of claim 13 wherein at least one of said first encrypted packets and at least one of second encrypted packets are indistinguishable from one another based upon a continuity count.

17. The television set-top box of claim 13 wherein at least a portion of said unencrypted packets, at least a portion of said first encrypted packets, and at least a portion of said second encrypted packets have an identical packet identifier.

18. The television set-top box of claim 13 wherein at least a portion of said unencrypted packets, at least a portion of said first encrypted packets, and at least a portion of said second encrypted packets have an identical packet identifier, and wherein said at least a portion of said first encrypted packets and at least a portion of said second encrypted packets have an identical continuity counter.

19. A method of managing multiple access control systems utilizing partially encrypting content, said method comprising:
reproducing a critical packet from packetized content to produce duplicate packets;
encrypting one of said duplicate packets according to a first encryption scheme to produce a first encrypted packet;
encrypting the other of said duplicate packets according to a second encryption scheme to produce a second encrypted packet;
transmitting said first and second encrypted packets along with unencrypted packets of said packetized content to at least one of said multiple control access systems; and
decrypting one of said first and second encrypted packets based upon the alignment of said first and second packets relative to one another.

20. The method of claim 19 further comprising the step of utilizing an identical packet identifier for said first and second encrypted packets.

21. The method of claim 19 further comprising the step of maintaining an identical packet identifier for said duplicated packets in order to perform said encryption steps.

22. The method of claim 19 further comprising the steps of associating at least a portion of said plurality of packets of said packetized content with one another with a counter and consecutively incrementing said counter to designate said at least a portion of said plurality of packets as being continuous, and utilizing an identical value for said counter after reproducing said critical packet and after separately encrypting both said duplicate packets.

23. The method of claim 22 wherein said decrypting step comprises decrypting said first encrypted packet because said first encrypted packet was received before said second encrypted packet.

24. The method of claim 22 wherein said decrypting step comprises decrypting said second encrypted packet because said second encrypted packet was received after said first encrypted packet.

25. The method of claim 19 wherein said decrypting step of said one of said first and second encrypted packets is performed by identifying said first and second encrypted packets having an identical continuity counter as a result of an unincremented continuity counter of either of said first and second encrypted packets and is further performed by decrypting said one of said first and second encrypted packets received subsequent to the receipt of the other of said first and second encrypted packets.

26. The method of claim 19 further comprising at least one of the following steps: discarding said first encrypted packet because said second encrypted packet was received subsequent to receiving said first encrypted packet; or discarding said second encrypted packet because said first encrypted packet was received before receiving said second encrypted packet.

27. The method of claim 19 wherein identical packet identifiers of said duplicated packets and identical continuity counts of said first and second encrypted packets are maintained throughout said method.

28. The method of claim 19 wherein said step of transmitting said first and second encrypted packets comprises forgoing incrementing a continuity counter of one of said first and second encrypted packets to be transmitted subsequent to the other of said first and second encrypted packets.

29. The method of claim 19 performed without remapping a packet identifier of said duplicate packets.

30. The method of claim 19 free from remapping packet identifiers to distinguish between said first and second encrypted packets.

* * * * *